(12) United States Patent
Lau et al.

(10) Patent No.: US 8,942,384 B2
(45) Date of Patent: Jan. 27, 2015

(54) DUAL-MODE HEADSET

(75) Inventors: Wilmer Lau, Vancouver (CA); Leon Wu, Suzhou (CN)

(73) Assignee: Plantronics, Inc., Santa Cruz, CA (US)

( * ) Notice: Subject to any disclaimer, the term of this patent is extended or adjusted under 35 U.S.C. 154(b) by 409 days.

(21) Appl. No.: 13/070,274

(22) Filed: Mar. 23, 2011

(65) Prior Publication Data

US 2012/0244801 A1 Sep. 27, 2012

(51) Int. Cl.
| | |
|---|---|
| H04R 1/10 | (2006.01) |
| H04R 25/00 | (2006.01) |
| H04R 1/00 | (2006.01) |
| H04R 9/06 | (2006.01) |
| H04R 11/02 | (2006.01) |
| H04B 5/00 | (2006.01) |

(52) U.S. Cl.
CPC .................................. H04B 5/0006 (2013.01)
USPC ............. 381/74; 381/370; 381/379; 381/428

(58) Field of Classification Search
CPC .. H04R 5/033; H04R 1/1041; H04R 2420/07; H04R 1/1008; H04R 5/0335; H04R 1/1066; H04R 7/12; H04R 31/003; H04R 2307/025
USPC ............................. 381/74, 370, 379, 428, 430
See application file for complete search history.

(56) References Cited

U.S. PATENT DOCUMENTS

| | | | |
|---|---|---|---|
| 5,224,151 A | 6/1993 | Bowen et al. | |
| 5,438,986 A * | 8/1995 | Disch et al. | 600/310 |
| 5,504,812 A * | 4/1996 | Vangarde | 379/430 |
| 5,729,604 A | 3/1998 | Van Schyndel | |
| 5,793,865 A * | 8/1998 | Leifer | 379/430 |
| 5,909,498 A * | 6/1999 | Smith | 381/380 |
| 6,016,347 A * | 1/2000 | Magnasco et al. | 379/430 |
| 6,031,166 A | 2/2000 | Petrarca | |
| 7,046,799 B2 * | 5/2006 | Ma | 379/433.13 |
| 7,058,194 B2 | 6/2006 | Jeon et al. | |
| 7,149,551 B2 | 12/2006 | Kim | |
| 7,190,797 B1 * | 3/2007 | Johnston et al. | 381/74 |
| 7,366,298 B2 | 4/2008 | Pedersen | |
| 7,620,173 B1 * | 11/2009 | Wilson | 379/430 |
| 8,331,603 B2 * | 12/2012 | Martenson et al. | 381/379 |
| 2004/0048641 A1 * | 3/2004 | Dufosse et al. | 455/575.2 |
| 2004/0052364 A1 | 3/2004 | Bodley et al. | |
| 2005/0058280 A1 | 3/2005 | Ma | |
| 2005/0272489 A1 | 12/2005 | Lee | |
| 2006/0132382 A1 * | 6/2006 | Jannard | 345/8 |
| 2006/0177086 A1 | 8/2006 | Rye et al. | |

(Continued)

FOREIGN PATENT DOCUMENTS

WO   WO-2006/110109 A1   10/2006

OTHER PUBLICATIONS

Ryan Peterson, Mvox Duo All-in-One Wearable Smart Communicator, The Gadgeteer, Feb. 7, 2008, http://the-gadgeteer.com/2008/02/07/mvox_duo_all_in_one_wearable_smart_communicator/.

(Continued)

*Primary Examiner* — Matthew Eason
*Assistant Examiner* — Sean H Nguyen

(57) ABSTRACT

A headset comprises a body, an audio transducer, an arm, a detector and processor. The detector can indicate whether the arm is in a first or second position. The headset operates in a headset mode or speakerphone mode responsive to the arm's position.

12 Claims, 4 Drawing Sheets

(56) References Cited

U.S. PATENT DOCUMENTS

| | | | |
|---|---|---|---|
| 2006/0274814 A1* | 12/2006 | Wang | 374/208 |
| 2006/0280295 A1* | 12/2006 | Runcie | 379/88.26 |
| 2007/0258614 A1* | 11/2007 | Langberg | 381/379 |
| 2008/0146289 A1* | 6/2008 | Korneluk et al. | 455/569.1 |
| 2009/0021382 A1* | 1/2009 | Smith et al. | 340/604 |
| 2009/0129623 A1* | 5/2009 | Weckstrom et al. | 381/386 |
| 2009/0197649 A1* | 8/2009 | Ranney | 455/569.1 |
| 2009/0252344 A1* | 10/2009 | Mao et al. | 381/74 |
| 2010/0056882 A1* | 3/2010 | Moore et al. | 600/301 |
| 2010/0158264 A1* | 6/2010 | Marten | 381/74 |
| 2010/0310107 A1* | 12/2010 | Saila et al. | 381/363 |
| 2011/0019859 A1* | 1/2011 | Van Der Beek et al. | 381/375 |
| 2011/0044460 A1* | 2/2011 | Rung | 381/58 |
| 2011/0086626 A1* | 4/2011 | Kerr | 455/418 |
| 2011/0249079 A1* | 10/2011 | Santamaria et al. | 348/14.02 |
| 2012/0243704 A1* | 9/2012 | Sorensen | 381/74 |

OTHER PUBLICATIONS

Nicole Lee, mVox Duo Communicator, Cnet Reviews, Jun. 13 2007, http://reviews.cnet.com/headsets/mvox-duo-communicator/4505-13831_7-32471286.html.

Nicole Lee, Kyrocera Wireless Portable Speaker with Headset, Dec. 13, 2006, http://reviews.cnet.com/ headsets/kyocera-wireless-portable-speaker/4505-13831_7-32172597.html?tag=also.

* cited by examiner

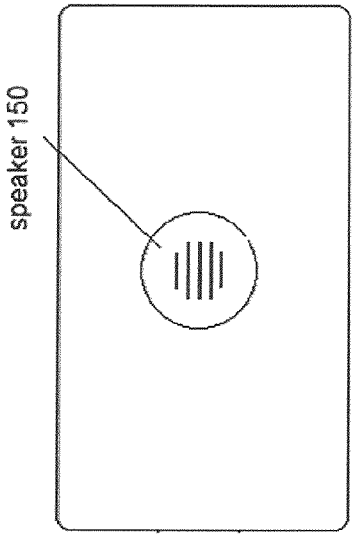
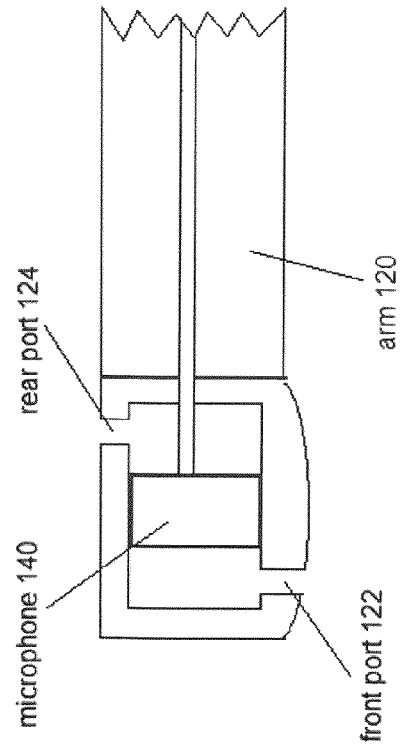
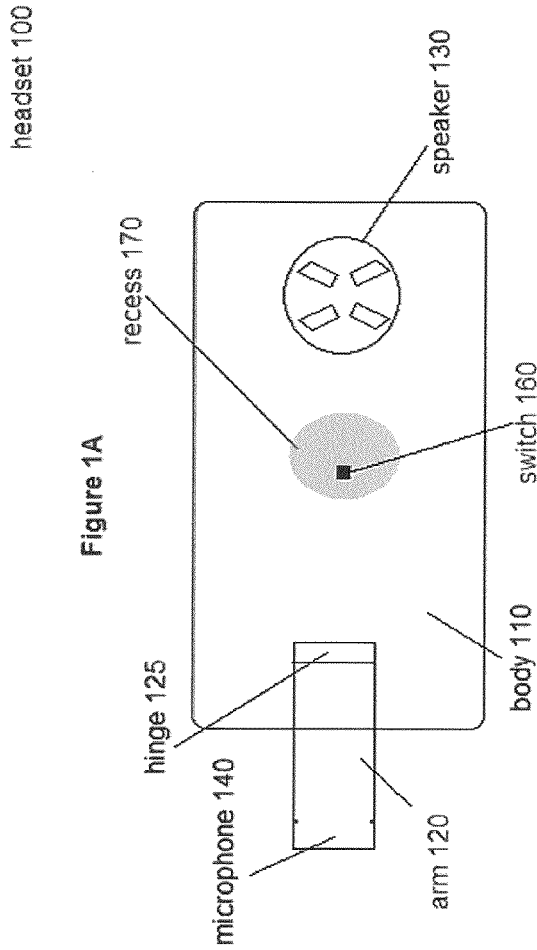
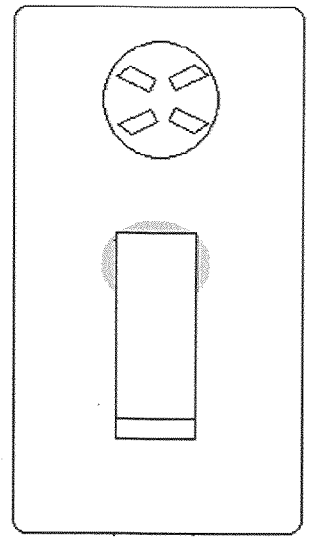

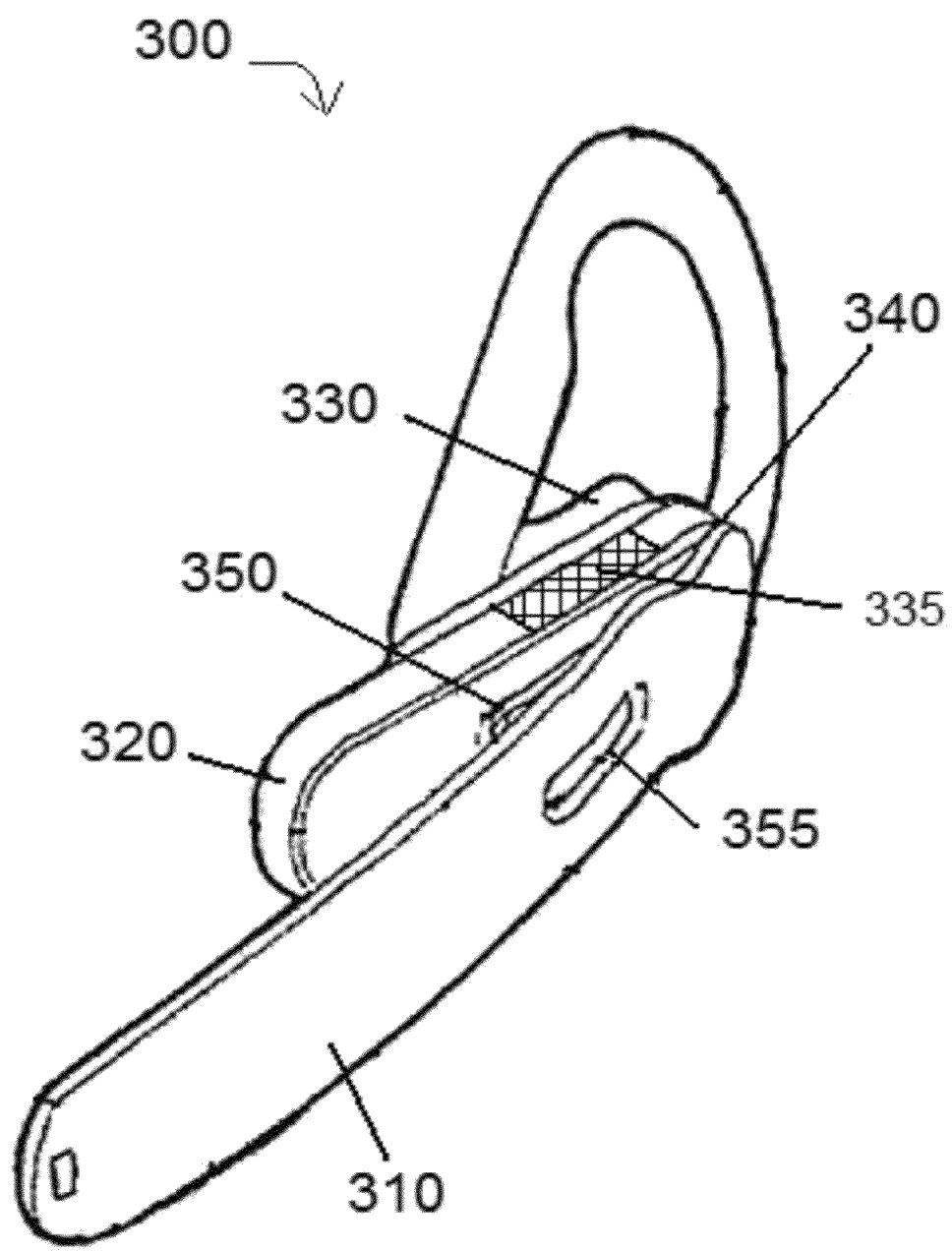

DUAL-MODE HEADSET

BACKGROUND

Headsets are a traditional solution to communicating hands-free, particularly when the user is mobile. However, prolonged use of a headset may make the user uncomfortable, prompting the user to transition to a handset while maintaining conversation. If using a mobile phone, this transition usually requires the user to manually disable the headset and set the mobile phone in handset mode. This solution is often cumbersome and inconvenient for the user, especially if they wish to remain hands-free.

SUMMARY OF INVENTION

According to one embodiment of the invention, a headset system comprises a main body, a first speaker, an arm, a detector and a processor. The arm is movable between a first and second position. The arm may be fixed to the main body by a hinge and may be adapted to be clipped to an article. The detector determines if the arm is in the first or second position.

The processor is adapted to operate the headset in at least one mode for near field and at least one mode for open air use. The processor may be further adapted to operate the headset in near-field use when the detector indicates that the arm is in the first position and open air loudspeaker use when the arm is in the second position. The processor may further comprise an echo canceller or noise gate circuit.

In one embodiment of the invention, the first speaker operates in at least one mode for near-field use and at least one mode for far-field use. The first speaker may operate in near-field mode when the arm is in the first position. Also, the first speaker may operate in far-field mode when the arm is in the second position.

In another embodiment the headset further comprises a microphone. The microphone maybe positioned in the main body. Alternatively the microphone may be positioned in the arm. The headset may be adapted to operate in a near-field mode responsive to the arm's position. For example, the microphone may operate in a noise canceling when the arm is in the open position. Furthermore, the headset may be adapted to operate in a far-field mode responsive to the arm's position. For example, the microphone may operate in an omnidirectional mode when the arm is in the closed position.

In another aspect of the invention, the headset may comprise a second speaker operatively coupled to the detector. The second speaker may have a transducer adapted to operate in at least one mode for far-field loudspeaker use. Furthermore, the processor may be adapted to activate the second speaker when the arm is in the first position and, optionally, deactivate the first speaker. The processor may also be adapted to deactivate the second speaker and/or activate the first speaker when the arm is in the second position.

According to one embodiment of the invention, a method of operating a headset in different modes of operation comprises detecting if the arm's position is in the first or second position, operating a first audio transducer in a near-field mode responsive to detecting the arm in the first position; and operating the first audio transducer in a far-field mode responsive to detecting the arm in the second position.

According to another embodiment of the invention, a method of operating a headset in different modes of operation comprises detecting if the arm's position is in a first or second position, activating a first audio transducer and deactivating a second audio transducer responsive to detecting the arm in the first position, and activating the second audio transducer and deactivating the second audio transducer responsive to detecting the arm in the second position. The method may further include operating the microphone in a near-field mode, such as a noise canceling mode, responsive the arm's position or and operating the microphone in a far-field mode, such as an omnidirectional mode, responsive to the arm's position.

BRIEF DESCRIPTION OF THE DRAWINGS

FIG. 1A illustrates an inside view of a headset according to one embodiment of the invention wherein the headset's arm is in an open position.

FIG. 1B illustrates a view of the headset of FIG. 1A showing headset's arm in a closed position.

FIG. 1C illustrates an outside view of an alternative embodiment of the headset of FIG. 1A.

FIG. 1D illustrates a cross section view of the arm and microphone of the headset of FIG. 1A.

FIG. 3 illustrates a perspective view of a headset according to a third embodiment of the invention.

DETAILED DESCRIPTION OF THE DRAWINGS

Figure 2A:
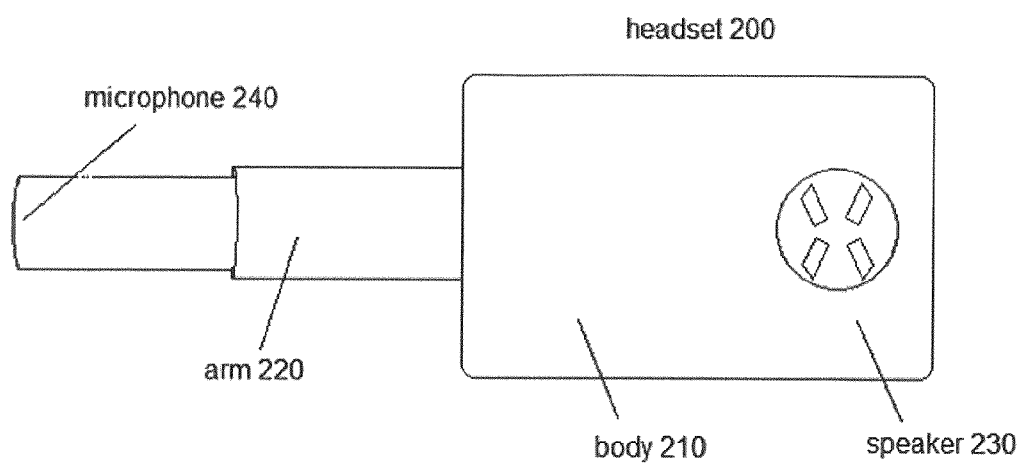
FIG. 2A illustrates an inside view of a headset according to a second embodiment of the invention wherein the headset's arm is in an extended position.

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit or scope of the invention. Thus, the present invention is to be accorded the widest scope encompassing numerous alternatives, modifications and equivalents consistent with the principles and features disclosed herein. For the purpose of clarity, details relating to technical material that is known in the technical fields related to the invention have not been described in detail as not to unnecessarily obscure the present invention.

Referring to FIG. 1A-C, shown is a headset 100 according to one embodiment of the invention. The headset 100 comprises a body 110, an arm 120, a microphone 140, a speaker 130, a switch 160, a hinge 125, a recess 170, a loud speaker 150 and a processor (not shown in FIG. 1).

The microphone 140 is coupled to a first end of the arm 120. At the opposite end, the arm 120 is coupled to the body 100 by a hinge 125. The arm 120 is pivotally rotatable with respect to the body 110, from an open position (shown in FIG. 1A) wherein the microphone 140 is generally directed toward the user's mouth, to a closed position (shown in FIG. 1B) wherein the microphone 140 is generally directed toward the body 110. It will be readily apparent to those skilled in the art that any suitable pivoting mechanism such as a cylindrical pin-and-tube pivoting mechanism may be employed for the pivoting hinge 125. Furthermore, the microphone 140 may alternatively be located inside the body 110 wherein a voice tube acoustically couples the microphone 140 to an acoustic sensing point located at the first end of the arm 120.

A switch 160 takes the form of a detection scheme for detecting the position of the arm 120. The switch 160 is a traditional mechanical switch that utilizes an actuator. Un-actuated, the switch 160 provides an open circuit; actuated, the switch 160 provides a closed circuit. The switch 160 is located in a recess 170 on the body's surface, adjacent to the arm 120 when in the closed position. Alternatively, the switch 160 may be located within the arm 120, the body 100, the hinge 125 or a combination thereof. It will be appreciated that various detection schemes known in the art can be used to detect the arm's 120 position including, but not limiting to, optical sensors, tactile sensors, magnetic sensors and photoelectric sensors.

The recess 170 increases the distance between the switch 160 and the user's face when the headset 100 is mounted on the user's head to prevent the user's face from inadvertently actuating the switch 160. A portion of the arm 120 is shaped to conform to the recess 170 to ensure the arm 120 will actuate the switch 160 in the closed position.

The speaker 130 is coupled to the inner surface of the body 110 and is in the form of an earbud. The earbud is preferably designed as a mounting device that enables the user to wear the headset 100. The speaker 130 comprises a transducer for converting an audio signal to audible output and generally operates in a near-field mode. The speaker 130 may be pivotably coupled to the body 110 to provide a comfortable fit when in use.

A loud speaker 150 is located on the body 110, preferably on the outer surface of the body 110 as shown in FIG. 1C. The speaker 150 comprises a transducer for converting an audio signal to audible output. In this embodiment, the second speaker 150 provides speakerphone functionality and generally operates in a far-field mode.

Figure 4:
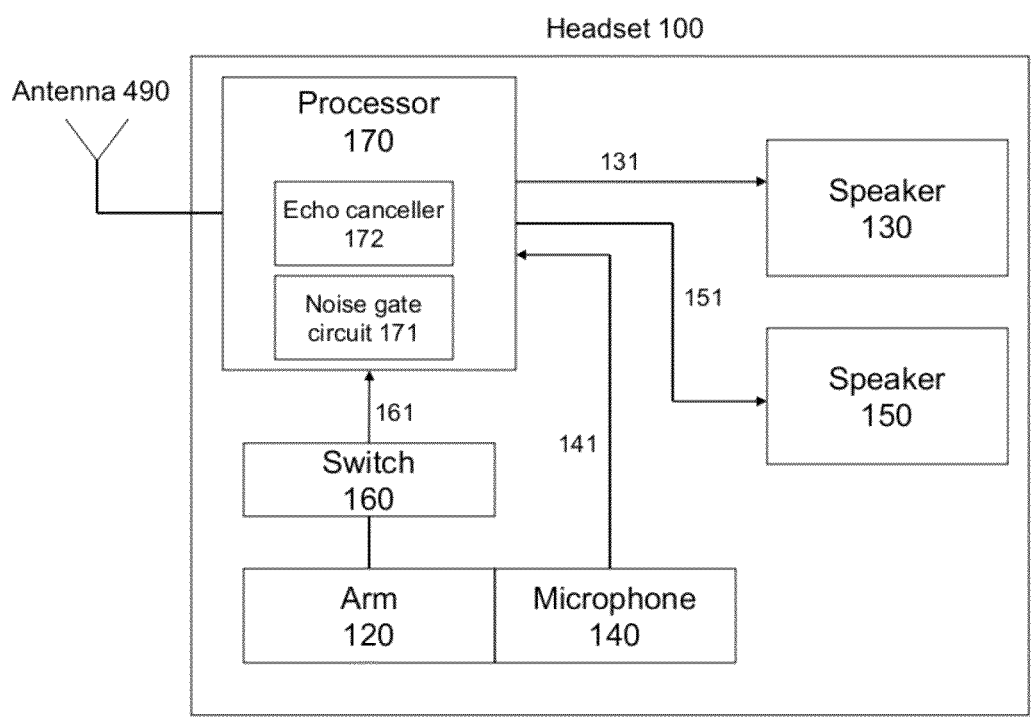
FIG. 4 illustrates a simplified block diagram of headset of FIG.

FIG. 4 illustrates a simple block diagram of the headset 100 show in FIG. 1. The processor 170 is housed in the body 110 and is electrically coupled to an antenna 490, the speaker 130, the loud speaker 150, the microphone 140 and the switch 160. The processor 170 comprises traditional electrical circuitry known in the art such as ADCs, DACs, amplifiers, filters and other signal processing circuits for transmitting and receiving audio signals. Optionally, the processor 170 may include circuitry such as an echo canceller 172 and/or noise gate circuit 171. The processor 170 is adapted to sense electrical properties and changes such as resistance and capacitance across the switch 160. Furthermore, the processor 170 may comprise a software control system for monitoring and controlling the audio signal processing and/or headset's mode of operation.

Referring back to FIG. 1A, the headset 100 is shown with the arm 120 in the open position. In the open position, the headset operates in a traditional headset mode. As shown in FIG. 4, the processor 170 provides the speaker 130 with audio signal 131 while deactivating or muting the loud speaker 150. When the user wishes to switch to speakerphone mode, he rotates the arm 120 to the closed position, as shown in FIG. 1B.

Referring to FIG. 1B, the headset 100 is shown with the arm 120 in the closed position. In the closed position, a portion of the arm 120 actuates the switch 160. Upon actuation, the switch 160 provides a closed circuit that is sensed by the processor 170. Alternatively, the switch 160 may actively send an electrical sense signal 161 to the processor 170. In response, the processor 170 operates the headset 100 in speakerphone mode. In speakerphone mode, the processor 170 deactivates speaker 130, suppressing the audio signal 131, and activates the loud speaker 150. Furthermore, the processor 170 performs signal processing on the audio signal 151 and input signal 141 in a manner appropriate for loud speaker or far-field operation. This may include increasing the amplitude or changing the frequency response of the audio signal 151 and/or input signal 141. To mitigate undesirable effects such as feedback, the processor 171 may include an echo canceller and/or a noise gate circuit.

If the user wishes to return to headset mode, he will rotate the arm 120 back to the open position wherein the switch 160 will become un-actuated (FIG. 1A). The processor 170 senses the open circuit caused by the un-actuation of switch 160. In response, the processor 170 activates speaker 130, deactivates loud speaker 150 and performs the appropriate signal processing to signals 131, 151 and 141 for headset mode operation. Alternatively, the switch 160 may actively send an electrical sense signal 161 to the processor 170 upon un-actuation of the switch 160. The processor 170 interprets the signal 161 and in response selects the appropriate mode of operation.

Additionally, the microphone 140 may be configured to operate in both a near-field mode and far-field mode as described in commonly owned U.S. Pat. No. 7,190,797, which is hereby incorporated by reference. Referring to FIG. 1D, shown is a partial cross section view of the arm 120 and microphone 140. The arm 120 provides a front microphone port 122 and rear microphone port 124. The front port 122 refers to the port closest to the user's mouth when the arm 120 is in the open position. The rear port 124 refers to the port further away from the user's mouth, shadowed by the first end of arm 120 when the arm 120 is in the open position. In the open position, the headset 100 operates in near-field mode, in this case a noise canceling mode; both ports 122,124 are open to expose the microphone 140 to sound from the user's mouth (front port 122) and ambient noise (rear port 124). In the closed position, the front port 122 is blocked by the body 110 at the recess 170 as shown in FIG. 1B and the headset 100 operates in far-field mode, in this case an omnidirectional mode. A portion of the arm 120 is shaped to conform to the recess 170 to ensure the closing of the front port 122 is sufficiently tight in order to block sound from reaching the microphone 140 from front port 122. Alternatively, a clip or other mechanism as described in U.S. Pat. No. 7,190,797 can be used to block off one of the two ports.

From the user's perspective, the transition between headset and speakerphone mode occurs automatically; no further input is required by the user, either at the base station or headset, after he has rotated the arm 120. This provides the user with a seamless and intuitive transition between modes without the need for an additional button or interface on the headset or base station. Furthermore, the dual-mode functionality is inherent to the headset. Consequently, the base station does not require a speakerphone feature nor requires the knowledge of the headset's mode of operation.

It will be appreciated that the headset of FIG. 1 may be configured with various combinations of microphones and speakers to operate the headset 100 in different modes of operation. For example, the headset 100 may comprise only a single speaker 130 that is adapted to operate in both near-field and far-field responsive to the arm's 120 position. In another example, the headset 100 may comprise a second microphone located on the outer surface of the body 110. The second microphone may be configured for far-field operation and activated only when the arm 120 is in the closed position.

Figure 2B:
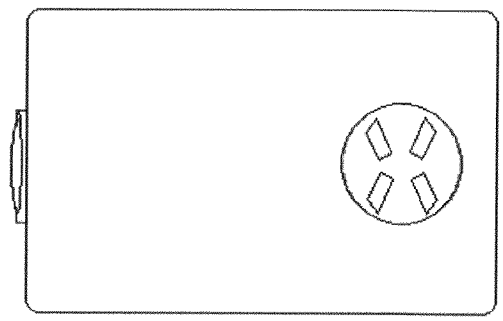
FIG. 2B illustrates an inside view of the headset of FIG. 2A showing the headset's arm in a retracted position.
Figure 2C:
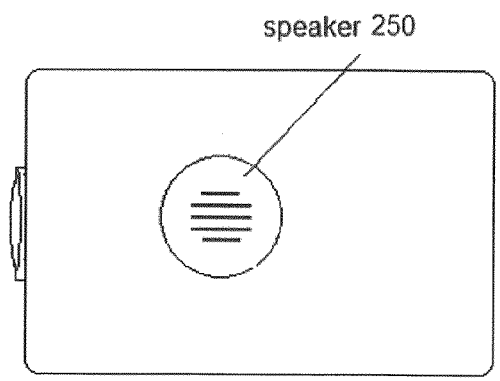
FIG. 2C illustrates an outside view of the headset of FIG. 2A

Referring to FIG. 2, shown is a headset 200 according to another embodiment of the invention. The headset 200 comprises a body 210, an arm 220, a microphone 240, a speaker 230, a loud speaker 250, a detector (not shown), and a processor (not shown).

The arm 220 can telescopically extend away from the body 210 to an extended position (shown in FIG. 2A) where the microphone 240 is directed toward the user's mouth and retract toward the body 220 to a retracted position (shown in FIG. 2B). Similar to previously described embodiments, the detector detects the arm's position and provides an electrical sense signal to the processor. Any suitable detector known in the art may be used. For example, a Hall Effect sensor located at the body 210 may be used to detect a magnet located within the arm 220 when the arm 220 is fully retracted. The processor interprets the sense signal and operates the headset 200 in the appropriate mode of operation in response to the arm's position. Switching between headset and speakerphone mode occurs automatically when the user extends or retracts the arm 220 to and from a retracted and extended position.

In speakerphone mode, the user may prefer to clip the headset to an object such as a car visor or clothing. Referring to FIG. 3, shown is a headset 300 with integrated boom clip as described in commonly owned U.S. Pat. No. 7,620,173 which is hereby incorporated by reference. The headset 300 comprises a body 320, an arm 310, a speaker 330, loud speaker 335, a hinge system 340, a light source 350, a light detector 355, and a processor (not shown).

The hinge system 340 includes a spring system which biases the arm 310 toward the body 320 to a closed position, and is configured to provide the user with the ability to swing the arm 310 from the closed position to an open position, where the arm 310 is relatively further from the body 320. The user can locate the arm 310 in the open position with the headset hooked to the user's clothing or other another external object. The external object is gripped between the arm 310 and body 320. The headset 300 operates in a headset mode when the arm 310 is in the closed position; speaker 330 is activated and loud speaker 335 is deactivated. In the open position, the headset 300 operates in speakerphone mode; speaker 330 is deactivated and loud speaker 335 is activated.

The light source 350 is located on the body 320 and is orientated adjacent to arm 310. The light detector 355 is located on the arm 310 and is orientated to be adjacent to the light source 355 when the arm 320 is in the closed position. In operation, the light source 355 generates a signal that is detected or not detected by light detector 355. The presence or absence of an object between the light source 350 and light detector 355 is what determines whether the headset 300 is clipped or not clipped to an external object. If the headset 300 is clipped to an external object, the object occludes the light signal emitted by the light source 350. The light detector 355 generates an electrical sense signal to the processor, based on the presence or absence of light detected by the light detector 210. The processor interprets the sense signal and operates the headset 300 in the appropriate mode.

We claim:

1. A headset system, comprising:
   a main body;
   a microphone;
   a first speaker;
   a second speaker adapted to operate in at least one mode for open air loudspeaker use;
   an arm movably coupled to the main body, wherein the arm is movable between a first position and a second position;
   a detector for indicating whether the arm is in the first position or in the second position; and
   a processor configured to operate the headset in a worn headset mode or a speakerphone mode responsive to an arm position, wherein responsive to movement of the arm from the second position to the first position the headset shifts from the worn headset mode to the speakerphone mode, and wherein a shift to the speakerphone mode comprises altering a microphone operation from a noise cancelling mode to an omnidirectional mode, and deactivating the first speaker and activating the second speaker.

2. The headset in claim 1, wherein the first speaker operates in a near mode when the arm is in the second position.

3. The headset in claim 1, wherein the arm is fixed to the main body by a hinge.

4. The headset in claim 1, wherein the arm is configured to extend and retract in length, wherein the first position is an extended position and the second position is a refracted position.

5. The headset in claim 1, wherein the processor is adapted to deactivate the second speaker when the arm is in the second position.

6. The headset of claim 1, wherein the processor comprises an echo canceller.

7. The headset of claim 1, wherein the processor comprises a noise gate circuit.

8. The headset of claim 1, wherein the headset system further comprises an article detector arranged to detect whether the arm is clipped to an article, and wherein the arm is adapted to be clipped to an article and the processor is configured to process an article detector output to determine whether the arm is clipped to the article.

9. A method comprising:
   operating a headset in a worn headset mode, the worn headset mode comprising:
      operating a headset microphone in a noise cancelling mode; and
      outputting a sound via a first speaker disposed at a wearer ear; and
   receiving a user action comprising adjusting a headset arm from a second headset arm position to a first headset arm position, the user action operating to shift the headset from the worn headset mode to a speakerphone mode, the speakerphone mode comprising:
      operating the headset microphone in an omnidirectional mode; and
      outputting the sound via a second speaker.

10. A method of operating a headset in different modes of operation, the headset comprising an arm movable between a first and second position, a microphone, a detector for detecting the arm's position, a first audio transducer, a second audio transducer and a processor, the method comprising:
    detecting if the arm's position is in the first or second position;
    operating the headset in a speakerphone mode responsive to detecting the arm in the first position, the speakerphone mode comprising operating the microphone in an omnidirectional mode and outputting sound via the second audio transducer; and
    operating the headset in a worn headset mode responsive to detecting the arm in the second position, the worn headset mode comprising operating the microphone in a noise cancelling mode and outputting sound via the first audio transducer.

11. The method of claim 10, further comprising:
    operating the microphone in a near-field mode responsive to the arm's position.

12. The method of claim 10, further comprising:
    operating the microphone in a far-field mode responsive to the arm's position.

* * * * *